L. G. GRABE.
DYEING APPARATUS AND THE LIKE.
APPLICATION FILED APR. 7, 1917.
1,261,921.
Patented Apr. 9, 1918.
2 SHEETS—SHEET 1.
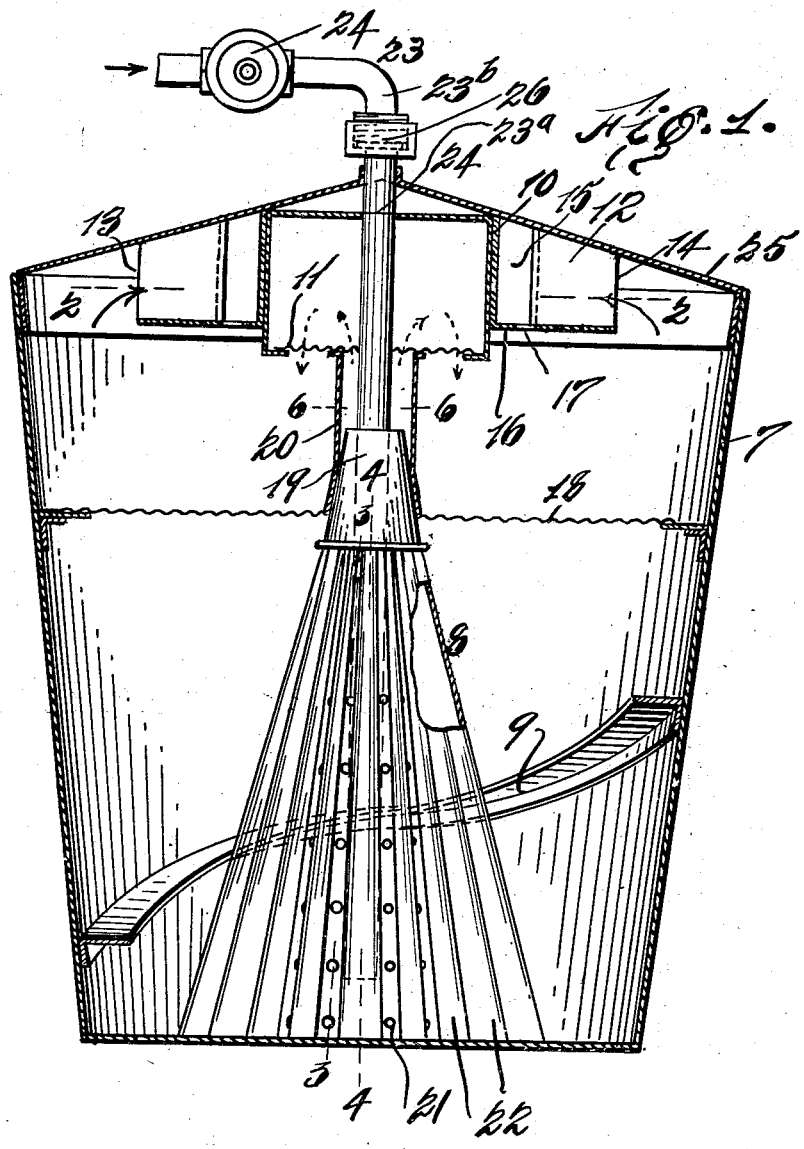

L. G. GRABE.
DYEING APPARATUS AND THE LIKE.
APPLICATION FILED APR. 7, 1917.
1,261,921.
Patented Apr. 9, 1918.
2 SHEETS—SHEET 2.
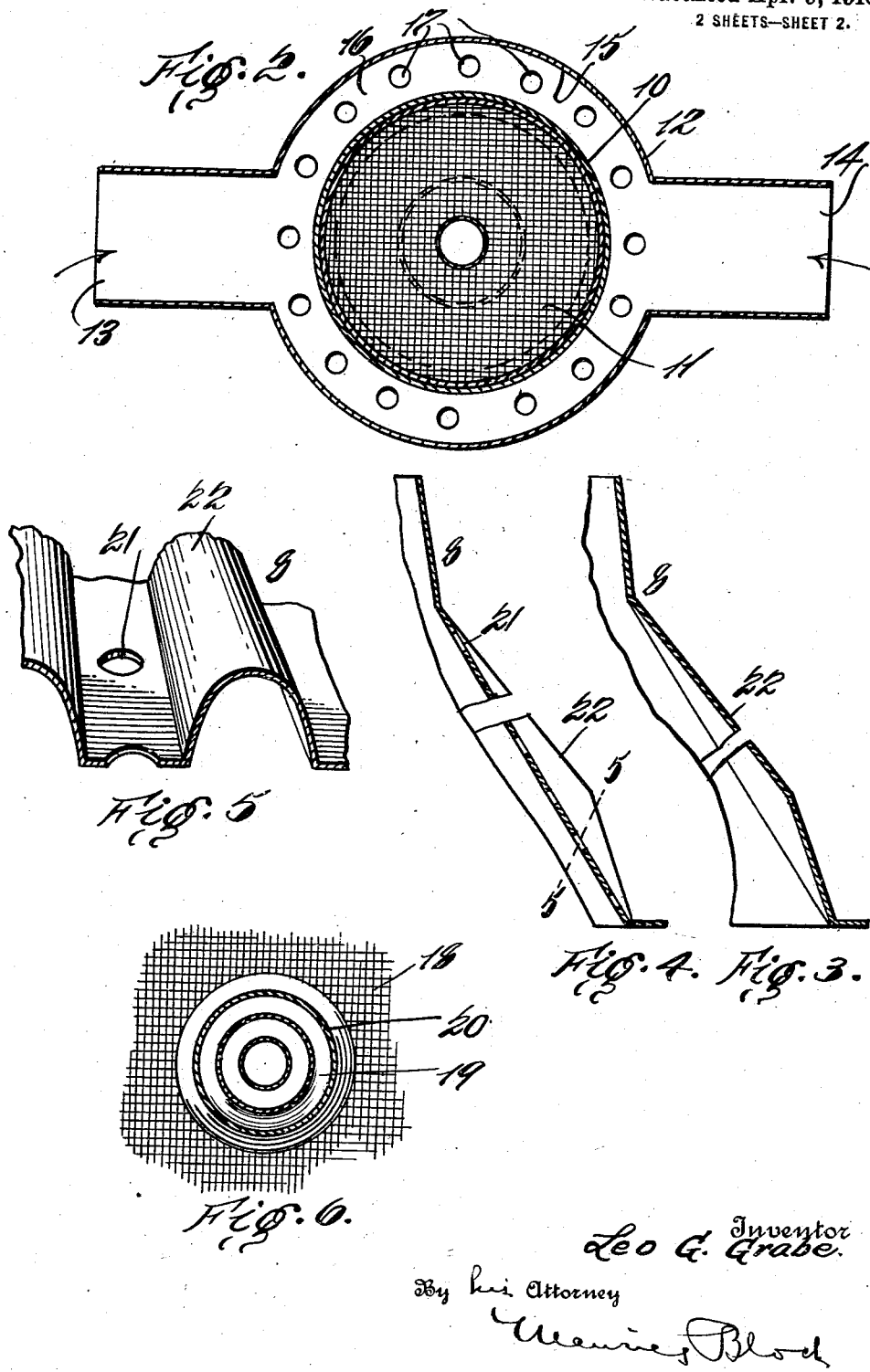
Leo G. Grabe, Inventor.
By his Attorney

UNITED STATES PATENT OFFICE.

LEO G. GRABE, OF ST. GEORGE, NEW YORK.

DYEING APPARATUS AND THE LIKE.

1,261,921.  Specification of Letters Patent.  Patented Apr. 9, 1918.

Application filed April 7, 1917. Serial No. 160,338.

*To all whom it may concern:*

Be it known that I, LEO G. GRABE, a citizen of the United States of America, residing at St. George, Richmond county, State of New York, have invented certain new and useful Improvements in Dyeing Apparatus and the like, of which the following is a full, clear, and exact description.

This invention relates to improvements in apparatus for dyeing fabrics or other similar goods, the object of my invention being to provide an inexpensive but efficient device which can be used for household purposes or by those not skilled in the art of dyeing. My improved dyeing apparatus, briefly stated, comprises a suitable vessel within which is placed a circulating device designed to cause the circulation of the dyeing liquid within the vessel by the aid of steam pressure, the steam being generated by the heating of the liquid over a flame, or by injecting live steam into the vessel. The action of the device to effectively perform the dyeing operation depends upon the action of the boiling liquid. The circulating device which I employ consists of a hollow conoidal vessel having a perforated wall through which the boiling liquid, mixed with air, will pass into the vessel. The liquid within the vessel will rise to the top thereof and be discharged into a mixing chamber, from whence it will pass into the vessel containing the articles to be dyed. The circulating device, as well as the articles to be dyed, will be submerged in the dyeing liquid.

I will now proceed to describe my invention in detail, the novel features of which I will point out in the appended claims, reference being had to the accompanying drawings, forming part hereof, wherein—

Figure 1 is a vertical sectional view of my improved apparatus, the circulating device being illustrated partly in elevation;
Fig. 2 is an enlarged sectional plan view, the section being taken on a line 2—2 in Fig. 1;

Figs. 3 and 4 are vertical sectional views of a portion of the circulating device, the sections being taken on lines 3—3 and 4—4, respectively, in Fig. 1;

Fig. 5 is an enlarged fragmentary sectional perspective view of a portion of the circulating device, the section being taken on a line 5—5 in Fig. 4, and Fig. 6 is an enlarged sectional detail plan view, the section being taken on a line 6—6 in Fig. 1.

As herein embodied, my improved apparatus consists of a vessel 7 to contain a liquid and the articles to be dyed. Within the vessel 7, I place a conoidal hollow circulating device 8, the function of which is to cause the liquid to circulate. To aid in the circulation of the liquid, I preferably employ a helically disposed-vane 9 which is fastened to the inner surface of the wall of the vessel as shown.

In the upper end of the vessel 7, I place a mixing-chamber 10 having an open bottom covered by a screen 11. Adjacent the mixing-chamber 10, I locate a condensing chamber 12 having inlet passages 13 and 14, which admit vapor to the interior 15 of the chamber 12. To permit the condensed vapors to fall back into the vessel 7, I provide the bottom 16 of the condensing chamber 12 with openings 17.

Intermediate the top and bottom of the vessel 7, I place a screen 18, which acts to prevent the articles immersed in the liquid in the lower part of the vessel from being forced out of the said liquid, but not to prevent the return of the liquid during the action of the circulation thereof.

As can be seen, the upper end 19 of the circulating device projects through the screen 18 and into a duct 20, the said duct being in communication with the mixing-chamber 10. As has already been stated, the circulating device 8 is hollow, and is made with a corrugated wall, the space between the corrugations being perforated as at 21. The corrugations 22 prevent the article being dyed from closing the openings, and hence unobstructed circulation is at all times provided for. During the dyeing operation, the boiling water, mixed with air, will be forced into the interior of the circulating device through the openings 21. As the circulating device is virtually a chamber, the hot liquid within the same will rise to the top (being greatly assisted by the pressure of the vapor), and pass through the duct 20 into the mixing-chamber 10, from which it will escape through the screen 11 into the body of the vessel 7. The circulation of the liquid will be a continuous stream in the path just described. Should the dyeing element and water tend to separate, they will be thoroughly mixed as they pass through the screen 11. The chamber 10 collects the liquid in whatever state it may be, but the screen 11 causes the water and dyeing element to mix as they pass through the meshes thereof.

The vapors that rise from the liquid not contained within the circulating device or chamber 8 will rise and find their way into the condenser 12. Liquid due to condensation will drop through the openings 17 back into the liquid in the lower portion of the vessel 7.

The helically disposed-vane will cause the liquid which does not find its way into the circulating device or chamber 8, to rise in a sinuous path.

To inject live or hot steam into the vessel 7, I may provide a duct 23 having a valve 24. The duct 23, as can be seen, passes through the mixing chamber 10, duct 20 and circulating device or chamber 8, and terminates adjacent the bottom of the vessel 7. The duct 23 includes a union 26 which connects the lower portion 23ª of the duct to the upper portion 23ᵇ thereof. While in operation, the vessel 7 will be closed at the top thereof by a cover 25.

The above mentioned combination of elements tends to thoroughly impregnate the articles to be dyed with the dyeing element, especially as the said element is violently agitated and forced against and through the said articles by the action of the circulating device 7.

It will, of course, be understood that my improved apparatus can also be utilized for disinfection, washing or other purposes, wherever a thorough penetration into fabrics of steam or boiling fluid is needed, and wherever in the foregoing specification and claims I speak of "dyeing apparatus," there is no intention to limit the use of the device to any particular purpose.

What I claim as my invention is:

1. In a dyeing apparatus a vessel to contain a dyeing liquid, a circulating device within said vessel consisting of a hollow conoidal chamber having numerous perforations through its side wall in various horizontal planes, and a mixing-chamber in communication with said circulating device.

2. In a dyeing apparatus a vessel to contain a dyeing liquid, a helically disposed-vane attached to the inner surface of the wall of said vessel, dye circulating means, and a mixing-chamber within said vessel.

3. In dyeing apparatus, a vessel to contain a dyeing liquid, a mixing chamber within the upper part of said vessel having an open bottom, a screen located in said open bottom, another screen extending across the interior of said vessel below the screen first mentioned, a condensing chamber in the upper part of said vessel near said mixing chamber, said condensing chamber being adapted to receive the water condensed by the cover of the vessel and to discharge the same through openings on the middle part of the second screen above mentioned, and a circulating device arranged in said vessel to cause the liquid in the latter to enter said mixing chamber.

4. In a dyeing apparatus, a vessel for containing a dyeing liquid, a mixing chamber in the upper part of said vessel, a circulating device in said vessel for causing the liquid in the latter to enter said mixing chamber, a condensing device arranged in the upper part of said vessel to receive the water condensed by the cover thereof and a screen arranged across the interior of said vessel below said condensing chamber, the latter being provided with openings in its bottom arranged to discharge on the middle part of said screen.

5. In a dyeing apparatus a vessel to contain a dyeing liquid, a hollow conoidal circulating device within said chamber having a perforated wall, and a supplemental circulating device consisting of a helically disposed-vane secured to the inner surface of the wall of said vessel.

6. In a dyeing apparatus a vessel to contain a dyeing liquid, a mixing-chamber within said vessel, a duct communicating with said mixing-chamber, a circulating device within said vessel consisting of a hollow conoidal chamber having a wall perforated at various points of its height, the upper end of said circulating device being located within said duct.

7. The combination of a vessel to contain a liquid, a circulating device within said vessel consisting of a hollow conoidal vessel having a corrugated wall, the space between the corrugations being perforated, a mixing-chamber within said vessel, and a duct connecting the upper end of said circulating device and said chamber.

8. The combination of a vessel to contain a liquid, a circulating device within said vessel consisting of a hollow conoidal vessel having a corrugated wall, the space between the corrugations being perforated, a mixing-chamber within said vessel, and a duct connecting the upper end of said circulating device and said chamber.

Signed at New York city, N. Y., this 6th day of April, 1917.

LEO G. GRABE.

Witnesses:
MAURICE BLOCK,
EDWARD A. JARVIS.